US012807279B2

(12) United States Patent
Koehnsen

(10) Patent No.: US 12,807,279 B2
(45) Date of Patent: Nov. 24, 2026

(54) CONTROL OF A WATERCRAFT

(71) Applicant: Jetworx GmbH, Norderstedt (DE)

(72) Inventor: Jennifer Koehnsen, Hamburg (DE)

(73) Assignee: Jetworx GmbH, Norderstedt (DE)

( * ) Notice: Subject to any disclaimer, the term of this patent is extended or adjusted under 35 U.S.C. 154(b) by 868 days.

(21) Appl. No.: 17/951,228

(22) Filed: Sep. 23, 2022

(65) Prior Publication Data

US 2023/0019805 A1 Jan. 19, 2023

Related U.S. Application Data

(63) Continuation of application No. PCT/EP2021/056131, filed on Mar. 11, 2021.

(30) Foreign Application Priority Data

Mar. 25, 2020 (DE) ..................... 10 2020 108 245.2

(51) Int. Cl.
*B63B 32/10* (2020.01)
*B63B 32/53* (2020.01)
*B63H 21/17* (2006.01)

(52) U.S. Cl.
CPC .............. *B63B 32/10* (2020.02); *B63B 32/53* (2020.02); *B63H 2021/171* (2013.01); *Y02T 70/5236* (2013.01)

(58) Field of Classification Search
CPC .......... B63B 32/00; B63B 32/10; B63B 32/53
See application file for complete search history.

(56) References Cited

U.S. PATENT DOCUMENTS

| | | | |
|---|---|---|---|
| 5,582,529 A | 12/1996 | Montgomery | |
| 6,192,817 B1 | 2/2001 | Dec et al. | |
| 7,121,909 B1 | 10/2006 | Meyerhoffer | |
| 8,636,552 B2 | 1/2014 | Braden et al. | |
| 11,180,224 B2 * | 11/2021 | Weisenburger ......... | B63B 32/70 |
| 11,459,068 B2 * | 10/2022 | Ostanin .................. | B63B 32/10 |
| 2002/0056408 A1 | 5/2002 | Dec et al. | |
| 2008/0168937 A1 | 7/2008 | Ruan et al. | |
| 2016/0207603 A1 | 7/2016 | Chapman | |
| 2017/0043844 A1 | 2/2017 | Chapman | |

(Continued)

FOREIGN PATENT DOCUMENTS

| | | |
|---|---|---|
| CN | 110239687 A * | 9/2019 |
| DE | 20 2011 051 071 U1 | 11/2011 |

(Continued)

*Primary Examiner* — Ajay Vasudeva
(74) *Attorney, Agent, or Firm* — Scully, Scott, Murphy & Presser, P.C.

(57) ABSTRACT

A watercraft including: a motor drive; a stern module; a bow module releasably connected to the stern module by a first connector; a controller; and a remote control configured to be operated by an operator. The remote control being configured to transfer movement control signals to the controller for operating the motor drive. Where the stern module having a first receiver, and the bow module having a transmitter. The transmitter is connected to the remote control and is configured to transmit the movement control signals received from the remote control. The first receiver is configured to receive the movement control signals from the first transmitter and forward the movement control signals to the controller.

8 Claims, 2 Drawing Sheets

(56) References Cited

U.S. PATENT DOCUMENTS

| | | | |
|---|---|---|---|
| 2018/0072383 A1 | 3/2018 | Montague et al. | |
| 2018/0127067 A1 | 5/2018 | Logosz | |
| 2019/0344862 A1* | 11/2019 | Tian | B63B 32/10 |

FOREIGN PATENT DOCUMENTS

| | | | | |
|---|---|---|---|---|
| DE | 202017107819 U1 * | 2/2018 | |
| EP | 2355539 B1 | 11/2012 | |
| EP | 3611092 A1 * | 2/2020 | A63B 35/12 |
| KR | 20150072180 A | 6/2015 | |
| WO | 2013/026714 A1 | 2/2013 | |
| WO | 2013/191501 A1 | 12/2013 | |
| WO | 2016/055410 A1 | 4/2016 | |
| WO | 2016/193382 A1 | 12/2016 | |
| WO | 2018/221768 A1 | 12/2018 | |

* cited by examiner

CONTROL OF A WATERCRAFT

CROSS-REFERENCE TO RELATED APPLICATION

The present application is a continuation of PCT/EP2021/056131 filed on Mar. 11, 2021, which is based upon and claims the benefit to DE 10 2020 108 245.2 filed on Mar. 25, 2020, the entire contents of each of which are incorporated herein by reference.

BACKGROUND

Field

The present disclosure relates to a watercraft with a motor drive, and more particularly, to a watercraft comprising modules that can be connected to one another, wherein a stern module and a bow module are provided which can be releasably connected by a first connection mechanism.

Prior Art

A surfboard is known from WO 2016/055410 A1, which can be broken into two pieces, wherein an inflatable body component and a drive component with an electric drive are provided. The drive component thereby has a rigid outer housing and comprises an electric motor and a rechargeable battery.

WO 2016/193382 A1 discloses an inflatable water sports device which can be broken into two pieces, namely into an inflatable body component and a drive component, wherein the drive component has an electric drive and forms or at least forms part of a stern of the water sports device. The water sports device can thereby be transported more easily. The drive component can be inserted into the notch of the inflatable body component in an interlocking manner without forming a gap.

To operate the watercraft, it is known to control the motor drive of the watercraft by means of an operating device held in the hand of an operator, wherein, for example, the accelerator can thereby be applied or respectively it can be accelerated or braked. A correspondingly provided cable between the operating device and the watercraft is cumbersome and can be torn out relatively easily in the event of a fall.

It is also known to control watercraft by a wireless remote control. This functions relatively well in watercraft with correspondingly high buoyancy. However, this works less well with smaller watercraft, which can also go under water easily, because the typically used transmitting frequency is highly dampened in the water, such that the signals transmitted from the remote control cannot always be reliably received.

SUMMARY

An object is to develop a watercraft of the type mentioned above such that it can be operated flexible and safe.

Such object can be solved by a watercraft with a motor drive, wherein the watercraft comprises modules that can be connected to one another, wherein a stern module and a bow module are provided which can be releasably connected by means of a first connection mechanism, wherein, to operate the watercraft, a control device and a remote control that can be operated by an operator is provided, by which movement control signals can be transferred to the control device, in which a first receiving device is provided arranged in or on the stern module, and a transmitting device is provided arranged in or on the bow module, wherein the transmitting device is connected to the remote control and is configured to transmit movement control signals, wherein the first receiving device is configured to receive the movement control signals and forward them to the control device.

The watercraft ensures reliable operability of the watercraft through short transmission paths from the transmitting device to the first receiving device. To operate the watercraft, the motor drive can be controlled and/or regulated by the control device. In addition, steering can also be provided, for example, by aligning the output of the motor drive, which, for example, can be configured as a jet drive or respectively as a jet drive module. Alternatively, a fin configured to move in a rotating manner in the horizontal direction can also be provided.

The connection of the transmitting device to the remote control can be wire-bound at least in sections or be completely wire-bound. The connection can also be wireless.

A wire-bound connection or respectively a connection with a cable is understood to mean an electrical connection or, for example, a connection with optical cables or respectively fibers.

The first receiving device and the transmitting device can be arranged opposite each other when the stern module is in the connected state with the bow module. The transmitting device can be arranged on the back of the bow and the receiving device can be arranged on the front of the stern. The transmitting device and the receiving device can be arranged on the deck of the bow module or respectively stern module or in the body of the watercraft, such that the transmitting device and the receiving device are not visible from the outside when the watercraft is assembled.

The transmitting device can be configured to transmit a signal wirelessly to the first receiving device. The signal can be in the gigahertz range and/or based on Bluetooth technology (for example, in the range of 2.402 to 2.480 GHz). Furthermore, the signal can also be in the MHz range, for example, at 27 MHz, 35 MHz, 40 MHz, or 433 MHz. Furthermore, the signal can also be a light signal, such as in a frequency range between ultraviolet and infrared, or visible light can be used. Alternatively, an acoustic signal can also be used, such as in a frequency range that is inaudible to humans.

As explained, the connection of the remote control to the transmitting device can be at least partially wired. The remote control can be releasably fixable in the bow module, for example, in one embodiment. An electrical connection of the remote control with a cable can then be provided. A light signal that can be received by a light receiving drive, for example, an optical cable, can also be emitted by the remote control, in order to then be emitted to the transmitting device by a light guide.

A second receiving device connected to the transmitting device by a cable can be provided in or on the bow module at a distance from the transmitting device, wherein the second receiving device can be configured to receive wireless movement control signals of the remote control and to forward them to the transmitting device. The forwarding of the movement control signals received by the second receiving device can be configured such that the same movement control signals are forwarded or alternatively modified movement control signals, so that the movement control signals that are transmitted from the remote control do not interfere with the movement control signals transmitted from the transmitting device and thus undesired operating modes do not occur.

To supply the transmitting device and/or the second receiving device in the bow module, an energy supply unit, such as a rechargeable battery, can be provided. Further, a solar cell for charging the energy supply unit can be attached to the bow module or integrated into the bow module.

In order to build the watercraft to be light and simultaneously stable and to enable it with extremely high variability, the watercraft can be provided with a jet drive module, wherein the watercraft comprises modules that can be connected to one another, wherein a stern module and a bow module are provided which can be releasably connected by a first connection mechanism, wherein in addition the jet drive module can be releasably connected to the stern module, wherein a power supply module that is arranged over the jet drive module in the stern module and can be releasably connected to the stern module can be provided, wherein the power supply module provides the power supply of the jet drive module.

Due to the modular configuration of the watercraft, it is possible to operate a wide variety of watercraft with the same jet drive module and the same power supply module. Thus, for example, the stern module can be configured as a stern of a surfboard or of a boogie board or of a canoe and the bow module can be configured as a corresponding bow of the respective watercraft. The jet drive module can also be installed, for example, in a canoe, tender boat, or sailboat. By providing a separate, such as exchangeable, power supply module, it can be easily replaced in order to extend the operation of the watercraft in a simple and efficient manner.

The jet drive module can provide an electrically operated jet drive. For this purpose, the jet drive can have an electric motor. The power supply module can have a rechargeable battery.

The first connection mechanism can only be accessible when the power supply module is removed from the stern module. This means that the first connection mechanism can be covered by the power supply module or respectively is no longer accessible when the power supply module is accommodated in the stern module, so that releasing the first connection mechanism in the operationally ready state of the watercraft is not possible. Rods or tubes, for example, which can be rotated into the bow module or firmly connected in another way can be provided as the first connection mechanism. If the bow module is produced at least partially from a plastic, shaping can be simply and efficiently possible in a rotation method in a mold. Corresponding receptacles can be provided in the stern module, into which receptacles these rods can be inserted and in addition a fixing mechanism such as a latching mechanism with a lever which can latch, for example, into a groove in a rod. Other fastening configurations can also be provided, such as snap closures, bail closures, or similar closures.

A second connection mechanism which can only be accessible when the power supply module is removed from the stern module can be provided to connect the jet drive module to the stern module.

As the second connection mechanism, it can be provided that the jet drive module can be screwed into or respectively fastened to the stern module with screws. The screws can be placed, for example, from above through holes in the stern module provided for this purpose in order to then be screwed into the jet drive module such that a jet drive module inserted into the stern module from below is fixed from above. In this case too, other fixing mechanisms can be used, such as, for example, a bayonet closure or a bail closure or a snap closure. However, screws can be used, since a low-vibration connection to the stern module is thus enabled. A user can also only get close to the second connection mechanism when the power supply module is removed from the stern module. Access to the second connection mechanism cannot be possible when the power supply module is installed in the stern module.

The jet drive module can have a jet drive that is accommodated in a rigid housing or respectively a solid body. A rigid housing can contain or can respectively have an inherent strength so as to provide dimensional stability of the housing of the jet drive module without aids such as compressed air. A rigid housing or respectively a solid housing is not an inflatable housing, such as an inflatable body component in accordance with WO 2016/193382 A1.

The stern module can comprise an accommodating body for accommodating the jet drive module, which body can comprise at least one frame made of a solid material or has a solid material, wherein the frame can adjoin the jet drive module or touch the jet drive module. A solid material is understood to also mean a rigid material. The solid material can have a corresponding inherent strength, such that it is dimensionally stable without aids such as compressed air. Through this measure, a very stable connection of the jet drive module to the stern module can be possible. Fewer vibrations can also then occur as a result. As a result, water entering a possible slit between the jet drive module and the stern module may not lead to this slit becoming larger during operation of the watercraft and thus to the gliding characteristics or respectively travel characteristics of the watercraft deteriorating, as can happen when a jet drive is installed in a stern made of inflatable material, as described, for example, in WO 2016/193382 A1. The material of the accommodating body and the material of the housing of the jet drive module or respectively the housing material of the jet drive can be made of an identically stiff or identically rigid material.

The accommodating body can have a recess that is complementary in shape to the jet drive module. The housing of the jet drive module can be complementary in shape to the recess in the accommodating body. As a result, an exact fixing and positioning of the jet drive module in the stern module can also be possible. The waterline in the transition from the jet drive module to the stern module can be uninterrupted or respectively substantially uninterrupted. The underwater surfaces of the jet drive module and stern module can be aligned or continuous. The recess for the jet drive module can be arranged at the bottom in the stern module.

The stern module can have an upper recess for accommodating the power supply module. By providing an upper recess for accommodating the power supply module, the power supply module can be replaced. In addition, this can ensure that the connection mechanism is securely covered when the power supply module is accommodated in the upper recess.

A flushing mechanism can be provided that conducts water at least partially around the power supply module to dissipate heat during operation of the watercraft. For this purpose, the flushing mechanism can comprise a gap between the stern module and the power supply module, wherein a discharge line can be provided from the gap through the stern module. As a result, water can enter into the gap and absorb heat from the power supply module and can exit through the stern module from the gap via the discharge line. The discharge line can end in a side face of the stern module in order not to have the cooling water stream directly visible during operation of the watercraft. The discharge line can end in the lower half of the side face of the stern module.

A locking mechanism that can be flush with the surface of the stern module can be provided for releasably fixing the power supply module. For example, a clamp mechanism or a lever mechanism that provides a locking can be provided, wherein the upper part of the lever can be flush with the upper surface of the stern module. Additional parts of the power supply module can also be flush or respectively in alignment with the surface of the stern module. The locking mechanism can also be a bayonet closure or a folding lever with a tongue and groove connection.

The bow module can have a solid end section body for connecting to the stern module. A solid end section body can be understood to mean an inherently stable or rigid end section body. A solid end section body can be understood to mean a non-inflatable end section body. For example, it can be produced through a plastic rotation method. On the end section body, an inflatable bow module part that is connected to the end section body can be provided in the front region of the bow module in order to keep the bow module very easy to transport and simultaneously to enable a fixed connection of the bow module to the stern module.

At least in the region of the connection of the end section body of the bow module to the stern module, the material of the end section body can be accordingly like the material of the stern module in the region of the connection to the bow module in order to keep a gap that may exist between the stern module and the bow module constant during operation of the watercraft. A seal between the stern module and the bow module can be provided.

Furthermore, the bow module can be hollow and can be at least partially floodable with water in order to enable an underwater scooter as the watercraft. The bow module can thus be flooded with water so that the watercraft can have overall an average specific density that corresponds substantially to the specific density of water.

The power supply module, when configured to be symmetrical to the longitudinal axis of the watercraft can be efficient and compact.

The watercraft can be configured as a surfboard, canoe, tender boat, or underwater scooter.

BRIEF DESCRIPTION OF THE DRAWINGS

Additional features become apparent from the description of embodiments in conjunction with the claims and the attached drawings. Embodiments can fulfill individual features or a combination of multiple features.

The embodiments are described below without limiting the general inventive idea using exemplary embodiments with reference to the drawings, wherein reference is explicitly made to the drawings with regard to all details that are not described in more detail in the text. In the figures.

In the drawings, the same or similar elements and/or parts are each provided with the same reference signs, such that a repeated introduction is dispensed with in each case.

DETAILED DESCRIPTION

Figure 1:
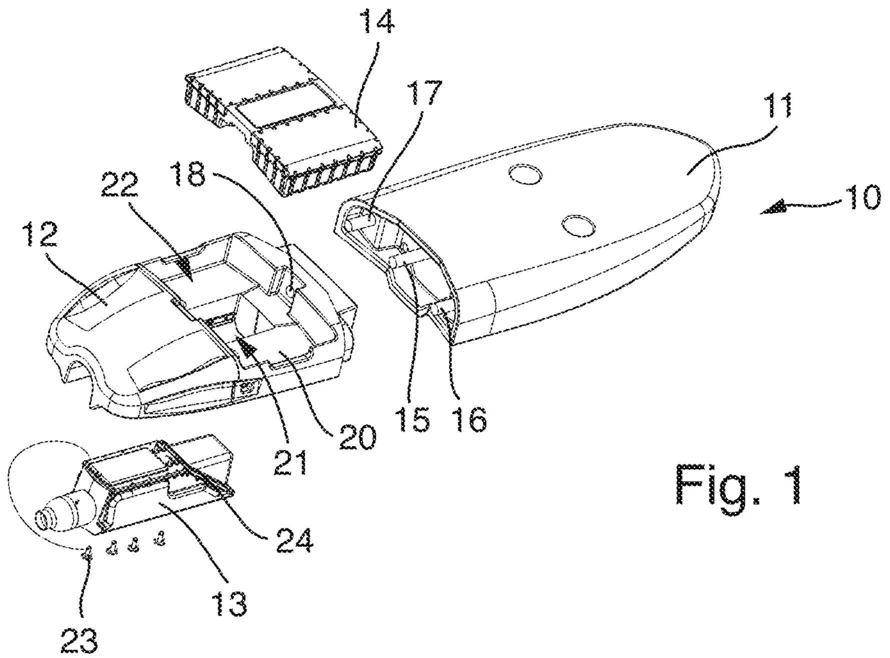
FIG. 1 illustrates a schematic three-dimensional exploded view of a watercraft.

FIG. 1 shows a schematic three-dimensional exploded view of a watercraft 10 in a first embodiment. A bow module 11 is provided which is produced from a plastic such as, for example, polyethylene, namely in a known rotation method. Connection rods 16 and 17 and a fixing rod 15 are firmly connected to the bow module 11. The bow module 11 has in a connection region a notch that is complementary in shape to a protrusion of the stern module 12. The stern module 12 has corresponding openings for accommodating the connection rods 16 and 17, the size of which fits precisely to the diameters of the connection rods 16 and 17. In addition, a continuous hole or respectively an opening 18 is provided, through which the fixing rod 15 can be placed so that the fixing rod 15 is closed with a closure mechanism, which can be a snap closure, a bail closure, or similar, as are known in the art, so that the bow module can no longer be released from the stern module and thus a stable fixing of the bow module to the stern module is enabled. The stern module also has an accommodating body 20, which in this exemplary embodiment is also produced from a plastic such as, for example, polyethylene and has a lower recess 21 for accommodating the jet drive module 13 and has above it a recess 22 for receiving the power supply module 14, such as a power supply.

The jet drive module 13 is slid from below into the recess 21 of the stern module 12 or respectively the stern module 12 is placed onto the jet drive module 13 from above. The jet drive module 13 can be firmly connected to the stern module 12 by screws 23.

The power supply module 14 can then be installed from above into the recess 22 of the stern module 12 and fixed by a fixing mechanism or connection mechanism (not shown).

For the electrical connection of the power supply module 14 to the jet drive module 13, electrical contacts 24 of the jet drive module 13 are provided which can be installed into corresponding plug contacts of the power supply module 14. The electrical components can be capsuled or respectively sealed against contact with water.

Figure 2:
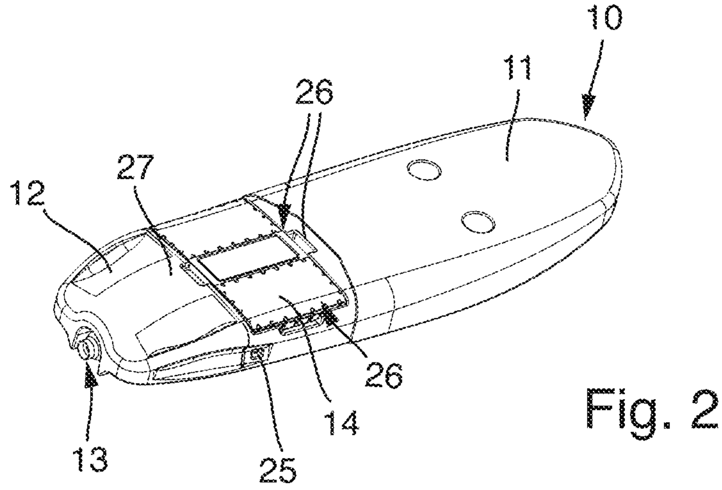
FIG. 2 illustrates a schematic three-dimensional view of the watercraft of FIG. 1 in the assembled state.

The jet drive module 13 is arranged relatively far to the back in the stern, such that a good supply with water is enabled during operation of the watercraft. The embodiment of FIG. 1 and FIG. 2 show surfboards that are produced from a relatively rigid polyethylene material.

The power supply module 14 is cooled during operation by water flowing over the power supply module 14, but also in that water can enter a gap 26, as is known in the art, between the power supply module 14 and the stern module 12. This water can be discharged again into the surrounding water through a discharge line 25, the outlet of which can be seen in FIGS. 1 and 2 on the side of the stern module 12.

The watercraft 10 can be built on at least four modules.

Figure 3:
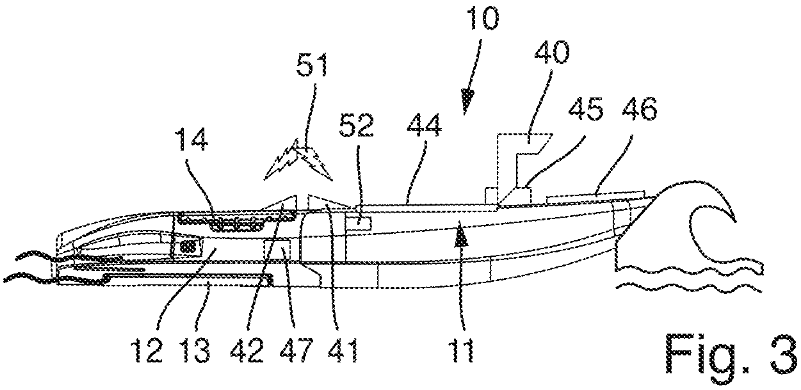
FIG. 3 illustrates a schematic side view of a watercraft.

FIG. 3 schematically shows the watercraft 10 in a side view in the assembled state. Here, it is a body board with a relatively small bow module 11 and a stern module 12. A power supply module 14 is installed in the stern module 12 and the jet drive module 13 is also indicated. A solar module 46 is attached to the deck of the bow module 11 in the front region of the bow.

A remote control 40, by means of which, for example, the accelerator can be applied or acceleration can be taken away again, is installed in a schematically illustrated connection device 45. The connection device 45 can comprise a handle, in which the remote control can be installed in a manner that is at least partially complementary in shape. The remote control 40 is connected with a cable to a transmitting device 41, such as a transmitter, which wirelessly sends out a second radio signal 51, which can be received by the first receiving device 42, such as a receiver. The signals thus received are forwarded to a controller 47, such as a controller, processor, CPU or computer, by which the jet drive 13, for example, is controlled and/or regulated.

In FIG. 3, another energy supply unit 52 is shown, which is integrated into the bow module and supplies at least the transmitting device 41 and/or the remote control 40 with electrical energy. The energy supply unit 52, which can be configured as a rechargeable battery, is supplied with energy, for example charged, by the solar module 46.

Figure 4:
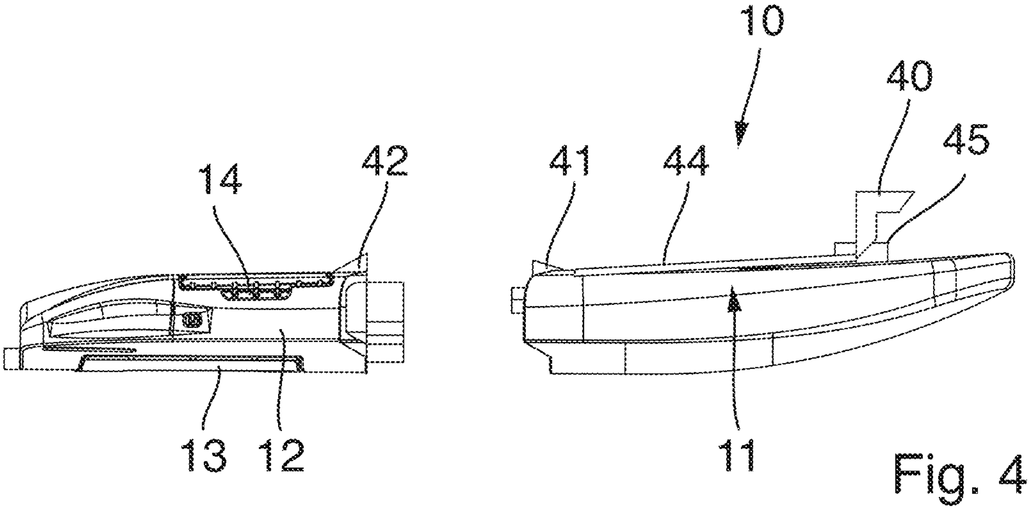
FIG. 4 illustrates a schematic sectional view of another embodiment of the watercraft in a partially disassembled state.

FIG. 4 schematically shows a side view of an incompletely mounted watercraft 10. Here, the bow module 11 is illustrated somewhat larger. It can thereby be, for example, a submersible watercraft.

Here, a second receiving device 43, such as a receiver, can be provided in the connection device 45, which is not illustrated, in order to connect the remote control 40 not mechanically or respectively electrically with the cable 44. The remote control 40 can still be held in, for example latch into, the connection device 45, and transmit a movement control signal to the second receiving device 43. Since very small distances are provided here, too, water in the region of the transmitting and receiving devices and the remote control does not disrupt the signals.

Figure 5:
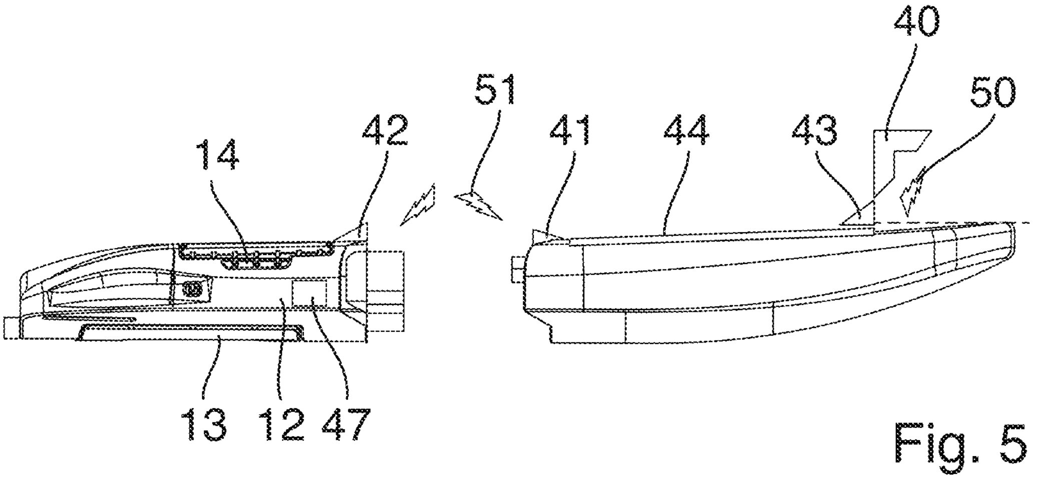
FIG. 5 illustrates another schematic view of a watercraft in another embodiment.

In FIG. 5, an alternative embodiment is illustrated. The remote control 40 here is illustrated at somewhat of a distance from the second receiving device 43. The remote control 40 can be, for example, picked up in the hand simply and also be held at a somewhat greater distance from the second receiving device 43 than the distance illustrated in FIG. 5. For the case that it is not a submersible watercraft but instead a vehicle that moves above the water, water will only be registered very infrequently in the region of the second receiving device 43, such that reliable operation of the watercraft 10 is possible.

Here in FIG. 5, the movement control signals are conducted to the second receiving device 43 by a first radio signal 50 and from there are forwarded by a cable, for example an electrical cable or an optical cable, to the transmitting device 41. From there, movement control signals are conducted to the first receiving device 42 by a second radio signal 51, which first receiving device forwards these signals to the control device 47, as also in the embodiment of FIG. 3.

The second radio signal 51 can be identical in its data structure to the first radio signal 50. However, it can also be a modified radio signal that transmits the movement control signals transferred with the first radio signal 50 in a modified form as the second radio 51 by the transmitting device 41. To modify the movement control signals, a different coding can be used or different frequencies or channels.

In the exemplary embodiments of FIGS. 3 and 4, a signal transmission via a data cable 44 takes place. The data connection from the bow module 11 to the stern module 12 is wireless and therefore maintenance-free. In FIG. 3, the handle or respectively the remote control 40 is installed in a fixed or releasably fixed manner With the embodiments in which the remote control 40 can be releasably connected or is completely released from the watercraft, multiple different bow modules can be used, such that the watercraft can be operated in a very modular manner with only one remote control 40. The transmitting device 41 can serve to amplify the transmitting signal or respectively of the movement control signal. This is given in the embodiment in which the first radio signal 50 is identical to the second radio signal 51. For the case that these two signals are different, there are no interferences between these two signals.

While there has been shown and described what is considered to be preferred embodiments, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

LIST OF REFERENCE SIGNS

10 Watercraft
11 Bow module
12 Stern module
13 Jet drive module
14 Power supply module
15 Fixing rod
16 Connection rod
17 Connection rod
18 Opening
20 Accommodating body
21 Recess
22 Recess
23 Screw
24 Electrical contact
25 Discharge line
26 Gap
27 Surface
40 Remote control
41 Transmitting device
42 First receiving device
43 Second receiving device
44 Cable
45 Connection device
46 Solar module
47 Control device
50 First radio signal
51 Second radio signal
52 Energy supply unit

What is claimed is:

1. A watercraft comprising:

a motor drive;

a stern module;

a bow module releasably connected to the stern module by a first connector;

a controller; and a remote control configured to be operated by an operator, the remote control being configured to transfer movement control signals to the controller for operating the motor drive;

wherein the stern module having a first receiver, and the bow module having a transmitter;

the transmitter is connected to the remote control and is configured to transmit the movement control signals received from the remote control; and the first receiver is configured to receive the movement control signals from the transmitter and forward the movement control signals to the controller;

the watercraft further comprising a second receiver connected to the transmitter by a cable, the bow module having the second receiver at a distance from the transmitter, wherein the second receiver is configured to wirelessly receive the movement control signals from the remote control and forward the movement control signals to the transmitter.

2. The watercraft according to claim 1, wherein the first receiver and the transmitter are arranged opposite each other when the stern module is in connected to the bow module.

3. The watercraft according to claim 1, wherein the transmitter is configured to wirelessly transmit the movement control signals to the first receiver.

4. The watercraft according to claim 1, wherein the connection of the remote control to the transmitter is at least partially wired.

5. The watercraft according to claim 1, wherein the remote control is releasably fixed to the bow module.

6. The watercraft according to claim 1, further comprising a power supply provided in the bow module to supply power to one or more of the transmitter and the second receiver.

7. The watercraft according to claim 6, wherein the power supply is a rechargeable battery.

8. The watercraft according to claim 7, further comprising a solar cell for charging the rechargeable battery, the solar cell being one of attached to the bow module and integrated into the bow module.

* * * * *